Figure 1:
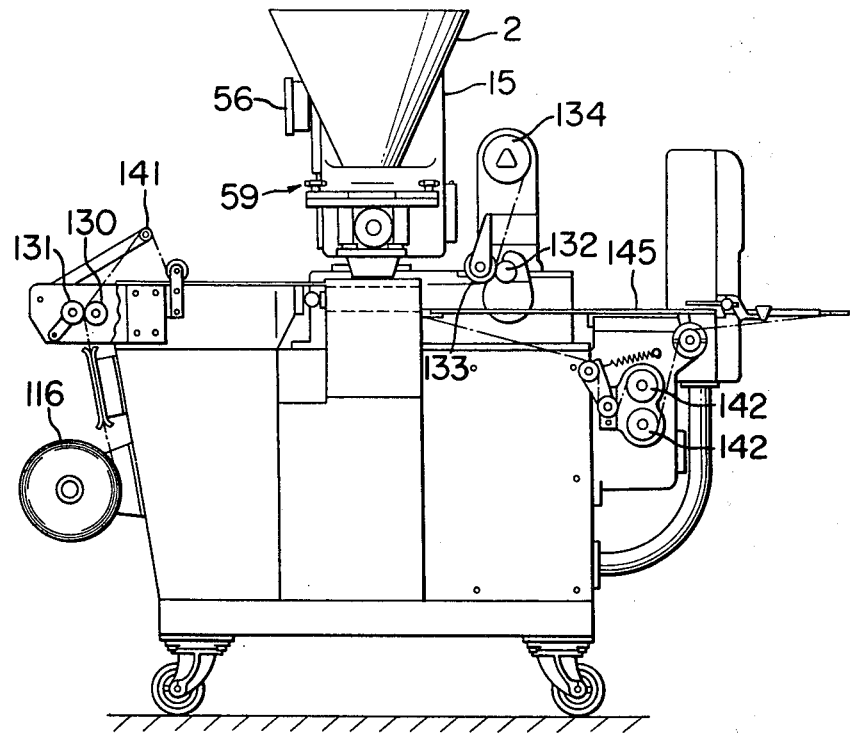

United States Patent [19]

Tashiro et al.

[11] 4,147,014

[45] Apr. 3, 1979

[54] APPARATUS FOR AUTOMATICALLY MANUFACTURING CUPPED FOOD MATERIALS

[75] Inventors: Yasunori Tashiro; Takahiro Yashiro; Katsuaki Higuchi, all of Utsunomiya, Japan

[73] Assignee: Rheon Automatic Machinery Co., Ltd., Japan

[21] Appl. No.: 868,457

[22] Filed: Jan. 10, 1978

Related U.S. Application Data

[63] Continuation of Ser. No. 672,794, Apr. 1, 1976, abandoned.

[30] Foreign Application Priority Data

Apr. 3, 1975 [JP] Japan .................................. 50-10954
Aug. 27, 1975 [JP] Japan ................................ 50-103758

[51] Int. Cl.² ........................ B65B 43/08; B65B 47/04
[52] U.S. Cl. ..................................... 53/559; 53/563; 53/575; 425/112
[58] Field of Search ............... 425/112, 122, 125, 176, 425/177, 256, 261, 305.1, 447, 448; 53/183, 184 R, 191, 192; 264/266; 72/335, 339

[56] References Cited

U.S. PATENT DOCUMENTS

| 1,870,889 | 8/1932 | Brand | 425/448 |
| 2,690,634 | 10/1954 | Ketchpez et al. | 53/192 |
| 2,700,939 | 2/1955 | Liston | 425/122 |
| 3,146,565 | 9/1964 | Otto | 53/192 |

FOREIGN PATENT DOCUMENTS

| 461794 | 6/1928 | Fed. Rep. of Germany | 425/112 |
| 1050294 | 1/1955 | Fed. Rep. of Germany | 72/334 |
| 1265559 | 4/1968 | Fed. Rep. of Germany | 425/112 |
| 1432972 | 7/1970 | Fed. Rep. of Germany | 425/122 |
| 2444267 | 4/1975 | Fed. Rep. of Germany | 264/266 |
| 672841 | 5/1952 | United Kingdom | 53/192 |

Primary Examiner—William R. Briggs
Attorney, Agent, or Firm—Guy W. Shoup; Gerard F. Dunne

[57] ABSTRACT

An apparatus for automatically manufacturing cupped food materials such as cupcakes, in which food material is filled in a cup which is formed from a blank cut out from a strip of sheet and pressed between a moulding female member and a moulding male member. The male member has a hollow portion extending through the center thereof and through which food material is ejected into the cup.

8 Claims, 31 Drawing Figures

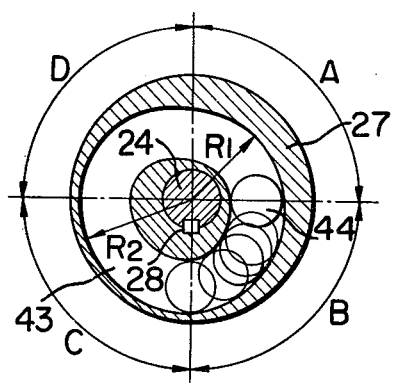
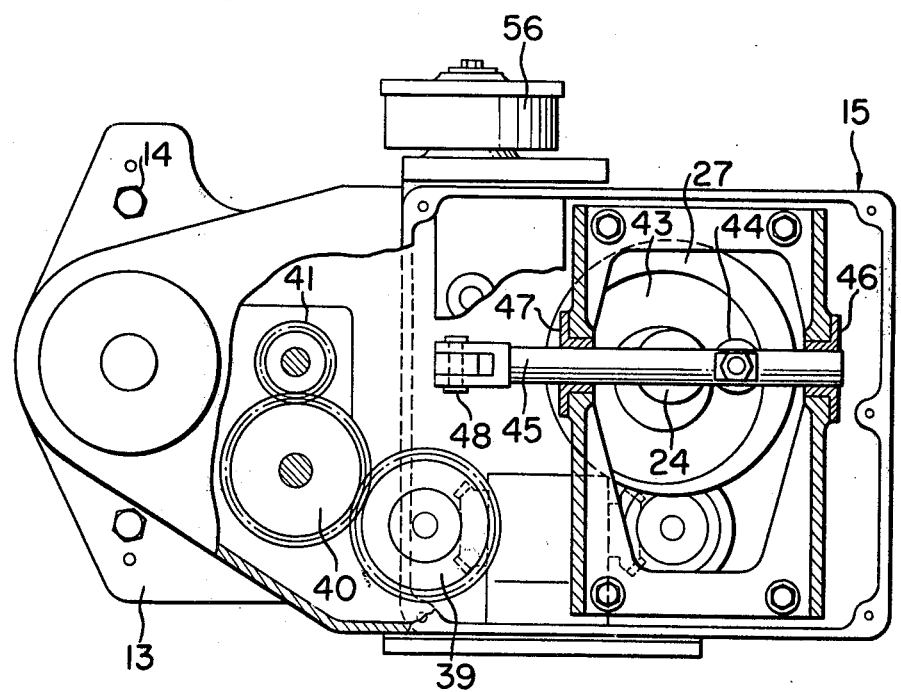

APPARATUS FOR AUTOMATICALLY MANUFACTURING CUPPED FOOD MATERIALS

This is a continuation of our copending application Ser. No. 672,794 filed Apr. 1, 1976; now abandoned.

The present invention relates to an apparatus for automatically manufacturing cupped fluid or semi-fluid food materials such as, for instance, dough, minced meat, minced vegetable, bean mash or the like.

In the past, in the manufacture of this kind of cupped food materials the formation of a cup and the supply of food materials were separately carried out and each process required a separate machine. Consequently, for the manufacture of cupped food material an empty cup which had been prepared beforehand was placed manually or mechanically in a specified area of an intermittently travelling conveyor and the conveyor was moved synchronously with the supply of food material from a food material ejector.

The conventional method or apparatus is inefficient and is inappropriate for mass production, if one considers the use of a separate machine for each process.

In such conventional art of manufacturing cupped food material, it is required to position the formed empty cup at the place where the cup is to be filled with food material, and to precisely synchronized the ejection of food material into the cup with the intermittent stop of the cup. It is difficult however to satisfy such requirements fully in the conventional art.

These difficulties have been eliminated by the apparatus of the present invention.

In the present invention, a cup is formed by moulding a blank cut out from a strip of sheet and food material is ejected into the formed cup in situ.

The apparatus of the present invention thus eliminates the need for employing a conveyor for feeding formed cups to the station where food material is ejected into the formed cups. The apparatus of the present invention consequently eliminates the need for using any electronic control to synchronize the the feed of formed cups by the conveyor and the feed of food material. Electronic control is generally undesirable for processing food material for reasons that sticking of food material to the electronic device or the parts of the apparatus often leads to malfunction and that a slight discrepancy in synchronization for each cycle of operation tends to accumulate when operation is repeated.

In accordance with the present invention there is provided an apparatus for automatically manufacturing cupped food materials comprising means for feeding a strip of sheet, means for intermittently advancing the strip, means for cutting out a blank of a predetermined form from the strip, means for moulding a cup of a predetermined form from the cut out blank, means for filling the cup with food material fed through a hopper, and means for discharging the cupped food material.

It is, thus, an object of the present invention to provide an apparatus for automatically and continuously manufacturing cupped fluid or semi-fluid food materials such as cupcakes.

Another object of the present invention is to provide an apparatus for manufacturing cupped food material, which apparatus enables food material to be positioned in the right place in a cup made of paper, aluminium foil and the like without employing any complicated positioning and timing mechanism.

The above and other objects, features and advantages of the invention will be apparent in the undermentioned detailed description.

Figure 2:
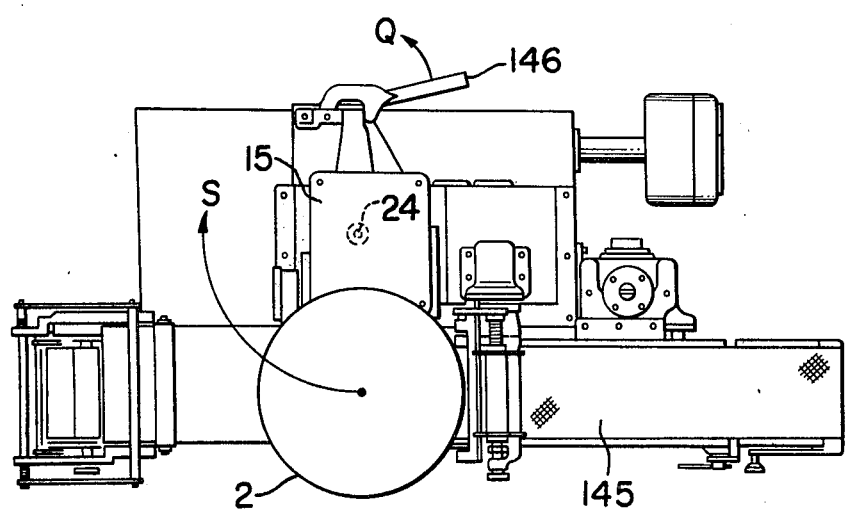
Figure 3:
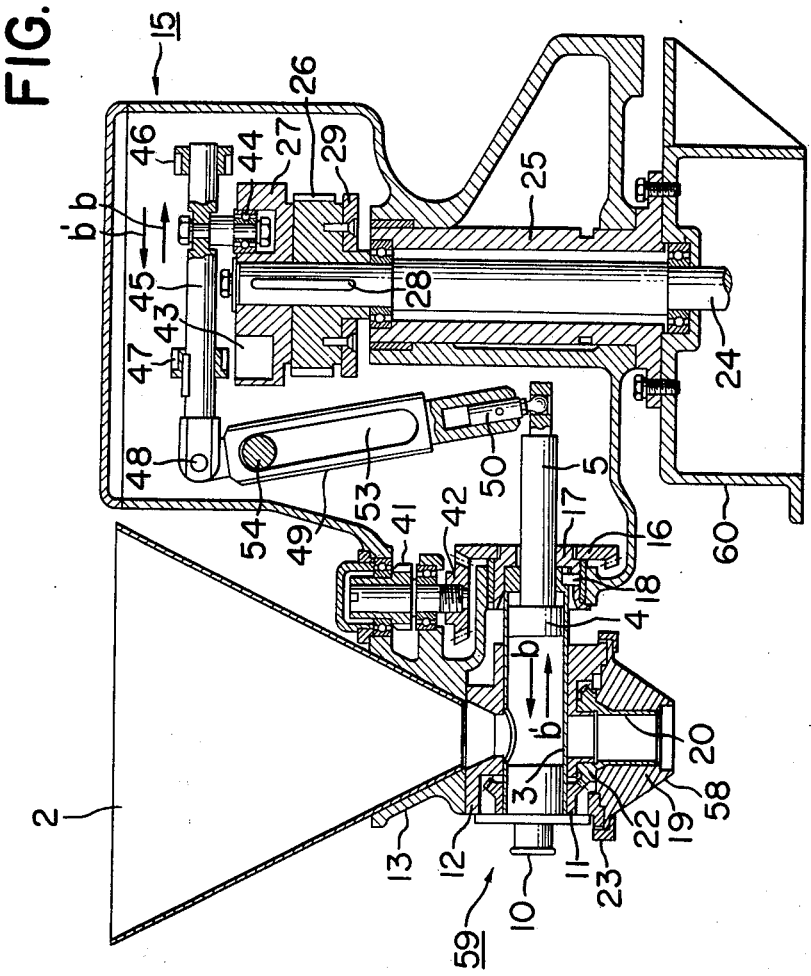
Figure 4:
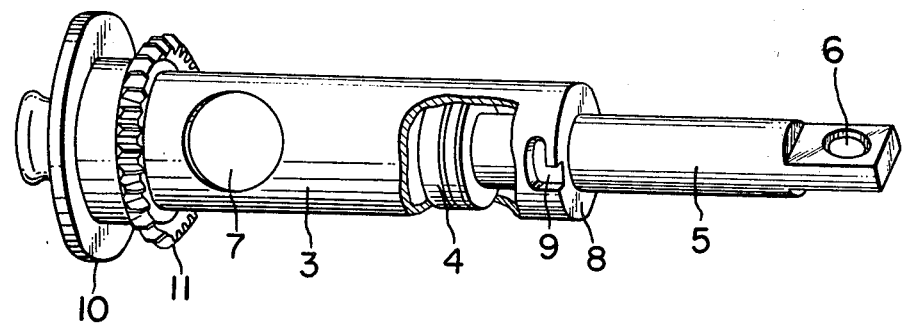
Figure 6:
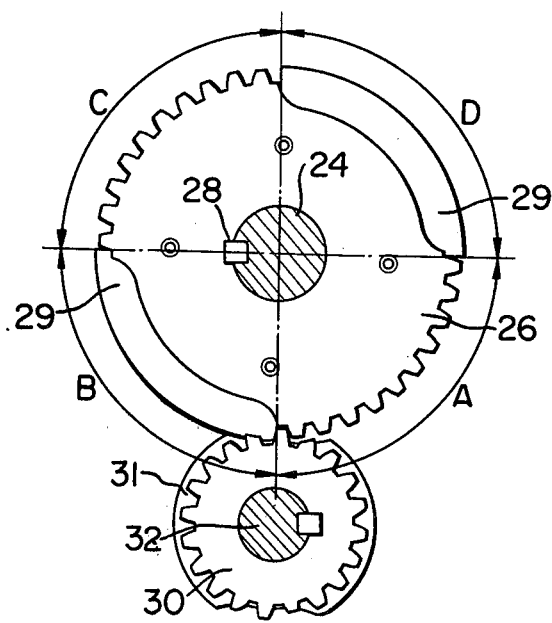
Figure 7:
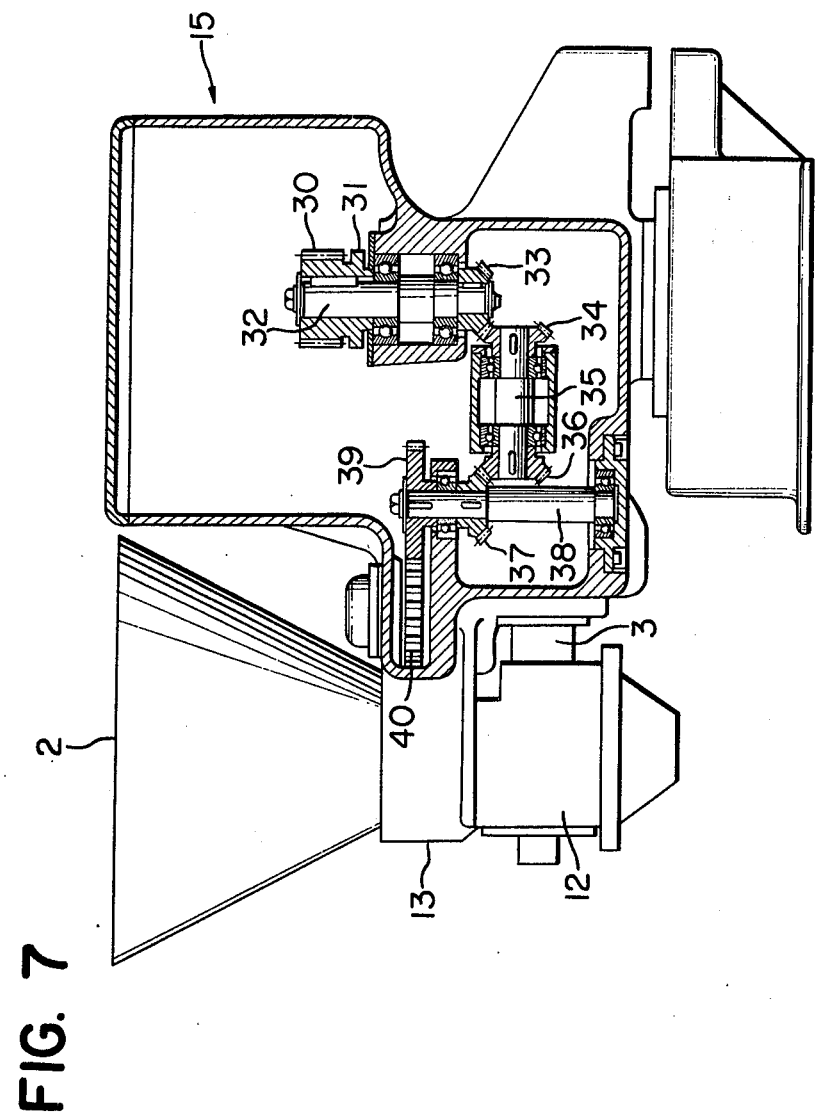
Figure 9:
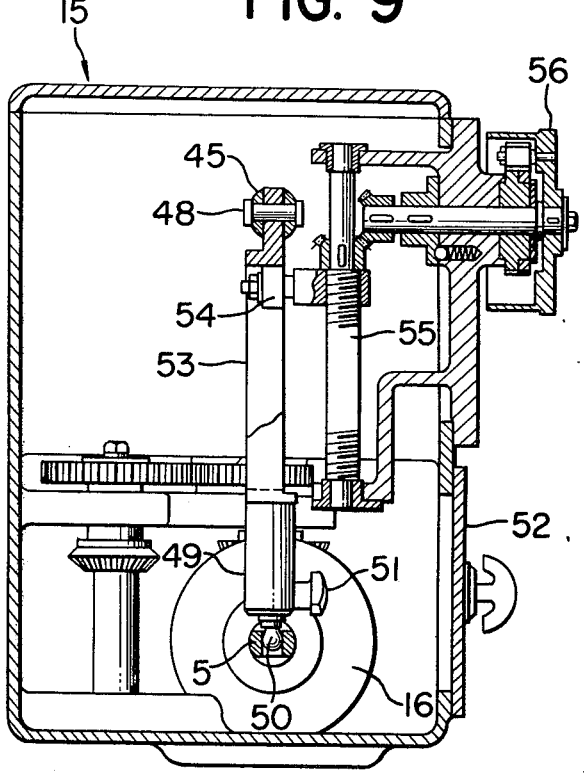
Figure 10:
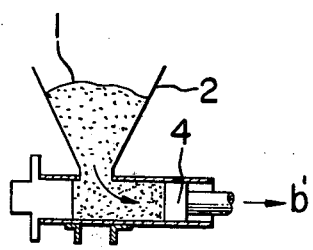
Figure 11:
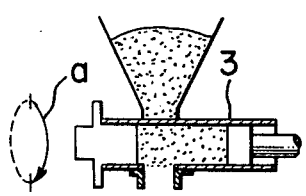
Figure 12:
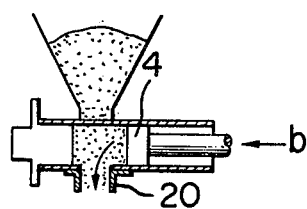
Figure 13:
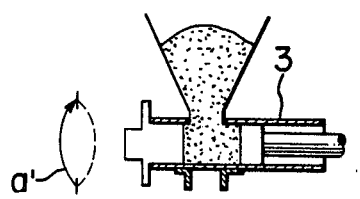
Figure 14:
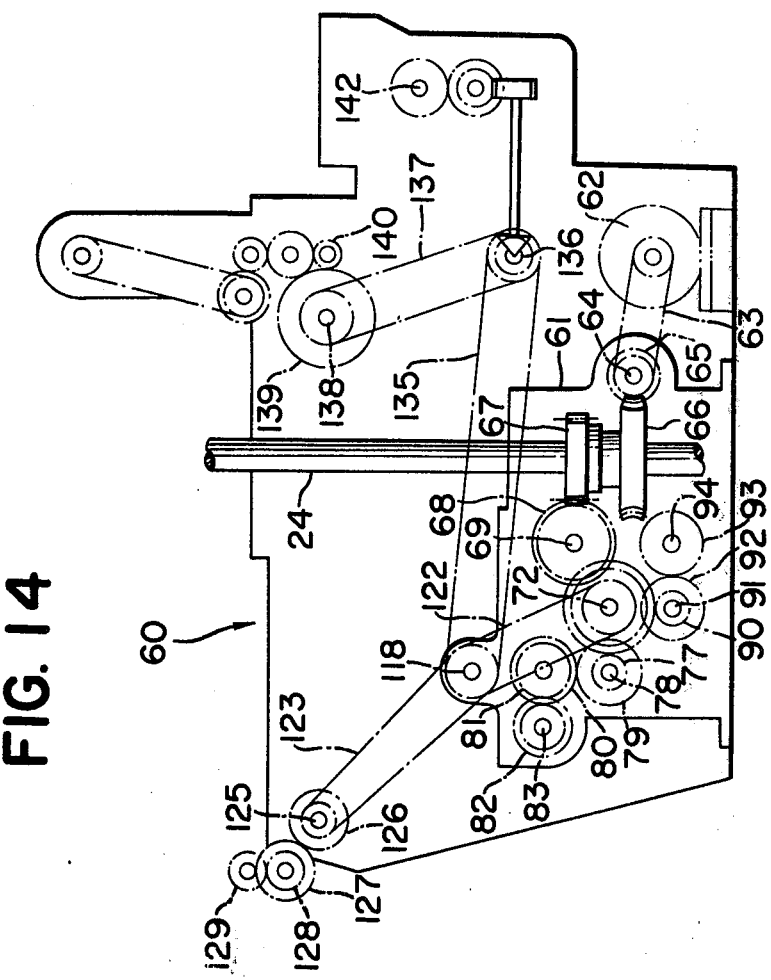
Figure 15:
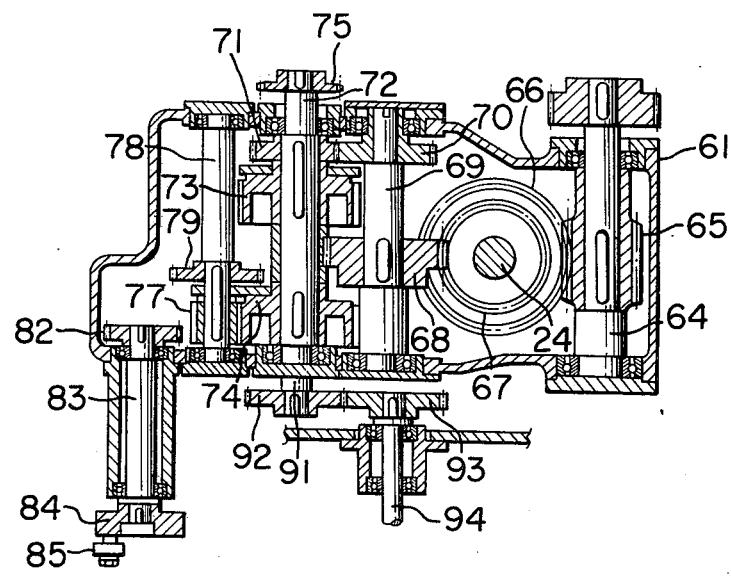
Figure 16:
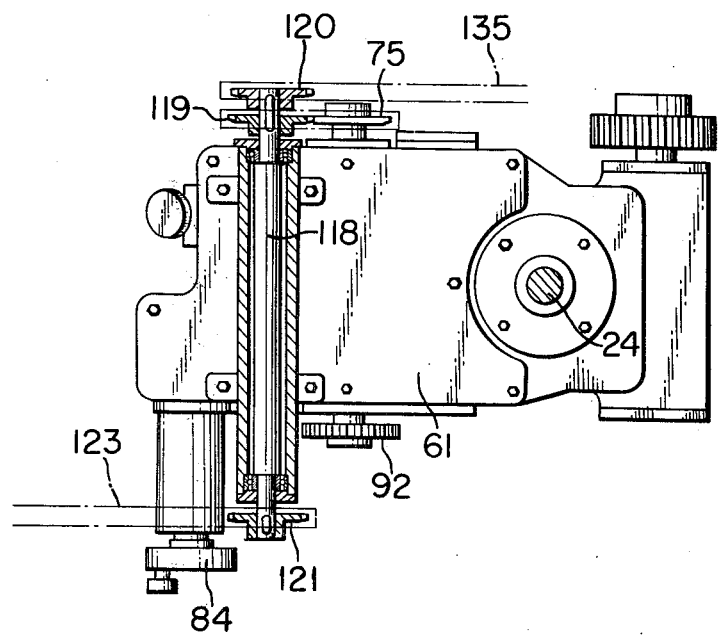
Figure 17:
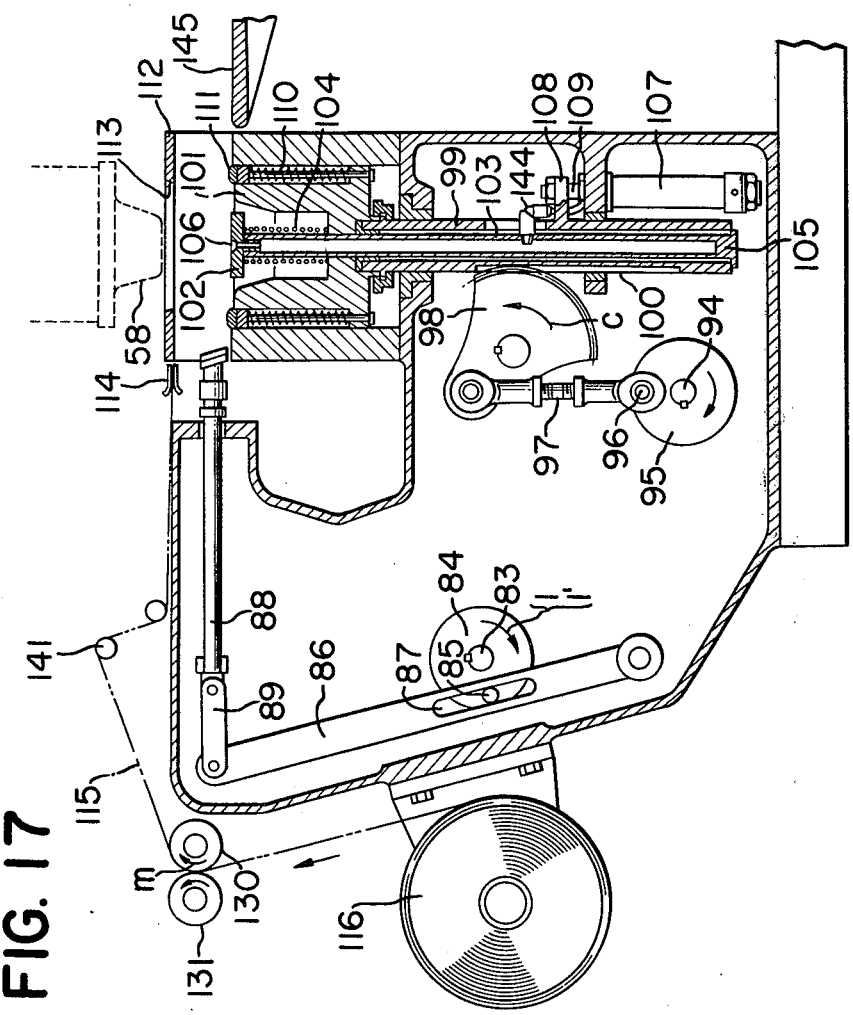
Figure 26:
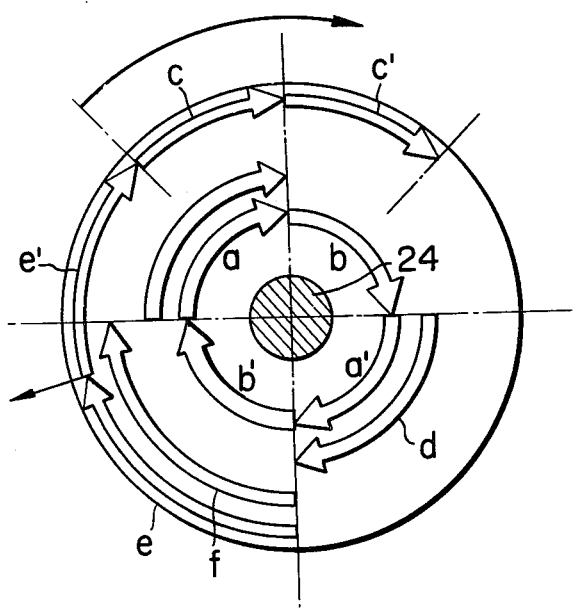
Figure 27:
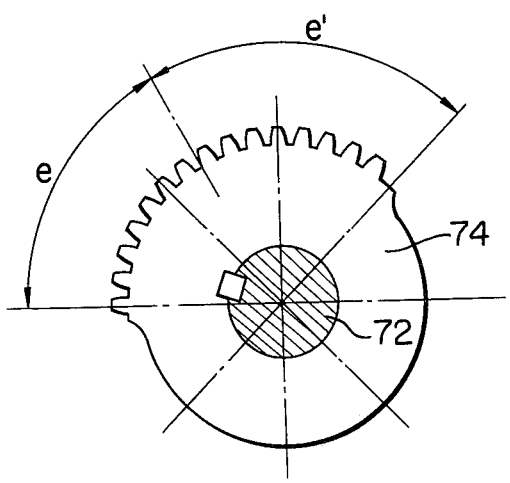

For a better understanding of the invention, reference will now be made by way of example to the accompanying drawings, in which:

FIG. 1 is an elevational side view of the overall apparatus according to the present invention, FIG. 2 is a plan view of the apparatus of FIG. 1, FIG. 3 is a vertical cross-section of the upper mechanism of the apparatus, FIG. 4 is a perspective view, partly broken away, of a piston-cylinder assembly, FIG. 5 is a plan view of the mechanism of FIG. 3, in which a hopper and a cover for a machine chamber are removed and a frame is partly broken away in order to show a part of the power transmission system for the mechanism, FIG. 6 is a view illustrating the engagement of gears for transmitting the rotation of a main input shaft to the intermittent rotation of a cylinder shown in FIG. 4, FIG. 7 is a vertical side view of the upper mechanism shown partly in cross section to illustrate another part of the power transmission system, FIG. 8 is a view illustrating the function of a cam, shown in horizontal cross section, which is locked to the input main shaft for the power transmission system, FIG. 9 is a view shown partly in cross section to illustrate still another part of the power transmission system, FIGS. 10 to 13 are views showing the operation of the piston-cylinder assembly, FIG. 14 is a schematic view of the power transmission system for the lower mechanism of the apparatus, FIG. 15 is a horizontal cross section of the gear box shown in FIG. 14, FIG. 16 is a plan view, shown partly in cross section, of the gear box, FIG. 17 is a vertical cross section of a part of the lower mechanism, FIGS. 18 to 25 are views showing in time sequence a cycle of the operation for manufacturing cupped food materials, FIG. 26 is a timing chart of the operation of the apparatus, FIG. 27 shows the structure of a gear for controlling the movement and stop of a pusher rod, FIGS. 28 to 31 are views showing in time sequence a portion of the operation for manufacturing cupped food materials according to a different embodiment of the apparatus.

Food materials 1 processed by the apparatus of the present invention comprise fluid or semi-fluid food materials such as, for instance, dough, minced meat and/or vegetable, bean mash or the like. A left-hand side of FIG. 3 shows an ejector mechanism which comprises a hopper 2 for feeding food materials, a piston-cylinder assembly and a nozzle device. As shown in FIG. 4, the piston-cylinder assembly comprises a cylinder 3, a piston 4 inserted in the cylinder 3, a piston rod 5 fixed to the piston 4, and a circular hole 6 provided at one end of the piston rod 5. The side wall of the cylinder 3 is provided with a hole 7 for receiving and discharging food materials. An end 8 of the cylinder 3 forms a bearing for the piston rod 5 and separates the interior of the cylinder 3 from the outside in cooperation with the piston rod 5. The end is provided with an L-shaped key way 9 thereon. A plug 10 for closing the other end of the cylinder 3 constitutes a grip for mounting or demounting the piston-cylinder assembly. A bevel gear 11 is fixed to the cylinder 3 between the grip 10 and the hole 7.

The cylinder 3 is fitted in a cylinder holder 12 which is supported by a hopper holder 13. The cylinder holder 12 can be detached from the hopper holder 13 by removing screws 14 (FIG. 5) for sanitary cleaning. The hopper holder 13 is connected integrally with the outer wall of the machine chamber 15.

When the cylinder holder 12 is fixed to the hopper holder 13 by the screws 14 and the cylinder 3 is mounted in the cylinder holder 12 as shown in FIG. 3, the end 8 of the cylinder 3 forming the bearing fits in a recess in the center of the shaft 17 of a bevel gear 16 and the piston rod 5 extends into the machine chamber 15 through the hole in the shaft 17. A key 18 fixedly secured to the shaft 17 is inserted in the keyway 9 so that when the bevel gear 16 rotates, the cylinder 3 also rotates simultaneously therewith.

A cylinder 19 is positioned underneath the piston-cylinder assembly. The outer surface of the cylinder 19 constitutes a male mould portion 58 of the mould for forming cups 143, as explained in further detail hereinbelow, and may take a frustoconical shape. The inside hollow portion of the cylinder 19 constitutes a passage for food material which is fed from the hole 7 of the cylinder 3 and discharged into formed cups 143 positioned underneath the cylinder 19. The cylinder 19 is clamped to the cylinder holder 12 by means of a locking screw 23 and is stationary. The above structure of the passage of food material is particularly suitable for discharging liquid food material such as spongecakes.

When food material processed is relatively hard and coherent such as the case of poundcakes, a rotatable inner cylinder 20 may be inserted in the hollow portion of the cylinder 19 in a slidable relationship therewith and a piano wire or wires 21 may be provided at a portion or portions of the cylinder 19 in close proximity of and underneath the lower end of the inserted cylinder 20. The piano wires may take various shapes such as a cantilever line, a diametric line, cross lines, etc. In this case, the inner hollow portion of the inner cylinder 20 constitutes the passage for food material. When the inner cylinder 20 rotates, the food material being discharged from the inner cylinder 20 is cut by the wires 21 and the leading portion of the food material is separated from the remaining portion thereof.

The upper end of the inner cylinder 20 constitutes a bevel gear 22, which engages the bevel gear 11 so that the inner cylinder 20 is rotatable simultaneously with the cylinder 3.

For fluid material such as dough for sponge cake, the inner cylinder 20 and the piano wires 21 are unnecessary.

A rotatable main input shaft 24 for transmitting the driving force for the operation of the present apparatus is supported by a cylindrical bearing pillar 25 secured to the frame of the machine chamber 15 and surrounding a portion of the main shaft 24. The main shaft 24 is rotated by a driving means explained hereinbelow.

At the portion of the main shaft 24 positioned in the machine chamber are provided a sector wheel or partly toothless gear 26 and a cam 27, which are fixed to the main shaft by a key 28 so that synchronized operations are maintained.

The sector wheel 26 consists of toothed portions A and C and toothless portions B and D as shown in FIG. 6. A stop plate 29 is fixed to the lower face of the sector wheel 26 over the toothless portion B and D. The sector wheel 26 engages a pinion 30 to which the continuous rotation of the main shaft 24 is transmitted causing the pinion 30 to conduct intermittent rotary motions. The stop plate 29 is designed to stop the inertial rotation of the pinion and locks it when the toothless portions of the sector wheel 26 come to the position opposite to the pinion 30. The stop plate 29 accomplishes the above purpose by engaging a complementary plate 31 mounted on the lower face of the pinion. A Geneva gear may also be employed in place of the sector wheel 26. The above engagement also applies when a Geneva gear is employed.

As shown in FIG. 7, the intermittent rotation of the pinion 30 is transmitted to a shaft 32 fixed to the pinion 30, and further to a gear 40 through bevel gears 33 and 34, a shaft 35, bevel gears 36 and 37, a shaft 38, and a gear 39.

The gear 40 meshes with a gear 41. A bevel gear 42 is fixedly supported by a shaft to which the gear 41 is also fixedly mounted (FIG. 3). Thus the gear 40 intermittently rotates the bevel gear 42 via the gear 41. The bevel gear 42 engages the bevel gear 16 to which the cylinder 3 is fixedly mounted. Consequently, the input to the continuously rotating main input shaft 24 intermittently rotates the cylinder 3 through the above-described train of gears and shafts. In this embodiment, the toothless portions and the toothed portions of the sector wheel 26 alternate at an angle of 90°, whereby a 360° rotation of the main input shaft 24 causes an intermittent 360° rotation of the cylinder 3. The cylinder performs a 180° rotation at the A position of the sector wheel 26, stops at the B position, performs another 180° rotation at the C position, again stops at the D position, and so forth. When the cylinder 3 stops its rotation at the B position of the sector wheel 26, the hole 7 on the sidewall of the cylinder 3 is made to turn upwards, facing the discharge end of the hopper 2. When it stops at the D position, the hole 7 turns downwards, facing the upper opening of the cylinder 20.

The train of motions starting from the cam 27 will next be described. The cam 27 is provided with a circular cam groove 43 as shown in FIG. 8. The cam groove 43 consists of a portion of a smaller radius $R_1$ at the A position, a portion of a larger radius $R_2$ at the C position, and portions at B and D positions connecting the portions at the A and C positions forming smooth curves. The key 28 locks the cam 27 and the sector wheel 26 to the main shaft 24 such that the four positions A, B, C, and D of the cam 27 shown in FIG. 8 and the four positions A, B, C, and D of the sector wheel 26 shown in FIG. 6 correspond to each other.

As shown in FIG. 3, in the cam groove 43 is inserted a cam follower 44 which is fixed to a push rod 45 which in turn is supported by plain bearings 46 and 47 at its end portions. One end of the push rod 45 is provided with a pin 48 which joints a lever 49 and the push rod 45. A connecting rod 50 is mounted in a hole in the lever 49 at the lower end thereof by means of a set screw 51 (FIG. 9), and is adapted to slide vertically in said hole by loosening the set screw. At the time of cleaning, the connecting rod 50 may be readily removed from the lever 49 by loosening the set screw 51 (FIG. 9). The connecting rod 50 is inserted in the hole 6 at one end of the piston rod 5 positioned outside the cylinder 3, thereby connecting the piston rod 5 with the lever 49.

In FIG. 9, a cover plate 52 covers an opening formed in a part of the machine chamber 15 which cover plate 52 functions as a door for access to the screw 51. An axially elongated opening 53 is formed in the lever 49, in which opening a fulcrum bar 54 is inserted. The fulcrum bar 54 may be vertically displaced by rotating a screw bar 55 by means of a handle 56.

The operation of the mechanism associated with the cam 27 is such that with the rotation of the main input shaft 24 the cam follower 44 fitted in the cam groove 43 is stationary at the A position, gradually goes away from the center axis at the B position, stops its shifting movement at the C position, and approaches the center axis at the D position. The guidance of the cam follower 44 by the cam groove 43 imparts linear forward and backward motion to the push rod 45. The forward and backward motion of the push rod 45 causes the forward and backward motion of the piston rod 5 through the movement of the lever 49 about the fulcrum bar 54. At this time, the position of the fulcrum bar 54 affects the magnitude of motion of the lever. Even if the motion of the push rod 45 is constant, the magnitude of motion of the piston 4 is enlarged if the position of the fulcrum bar 54 approaches the push rod 45, while the amount of motion of the piston 4 decreases if the position of the fulcrum bar 54 approaches the piston rod 5. Thus, the handle 56 (FIG. 9) controls the amount of motion of the piston 4, and hence the amount of food material to be discharged.

The discharge of food material at one rotation of the main shaft 24 is illustrated in FIGS. 10 to 13. The motion of the piston 4 due to the motion of the cam follower 44 going away from the axis of the cam 27 is indicated by the arrow b, and the opposite motion is indicated by the arrow b'. The motion of the hole 7 towards the cylinder 19 or 20 due to the rotation of the cylinder 3 is indicated by the arrow a, and the opposite motion is indicated by the arrow a'. The continuous rotation of the main input shaft 24 causes the simultaneous rotation of the sector wheel 26 and the cam 27. The motion of the sector wheel 26 imparts to the cylinder 3 a repeated cycle of motions consisting of motion a, suspension, motion a' and suspension, while the motion of the cam 27 imparts to the piston 4 a cycle of motions consisting of suspension, motion b suspension and motion b' synchronized with the cycle of motions of the cylinder 3. During the motion b' shown in FIG. 10 the hole 7 communicates with the discharge end of the hopper and stationary so that food material 1 is sucked from the hopper 2 into the cylinder 3 by the receding motion of the piston 4. During the motion a shown in FIG. 11 the piston 4 remains stationary and at the end of the motion a the hole 7 communicates with the cylinder 19 or 20. During the advancing motion b of the piston 4 shown in FIG. 12 food material in the cylinder 3 is discharged from the cylinder 19 or 20 through the hole 7. The intermittent rotation a and a' of the cylinder 3 functions as a measuring device of food material.

The repetition of the suction of food material 1 from the hopper 2 and discharge of food material from the cylinder 19 or 20 without any back flow is performed by a simple rotation of the single main input shaft 24. Synchronized operations such as the supply of paper, the vertical motion of the female mould for the formation of cups, and the discharge of food material are performed by a mechanism comprising a combination of gears at a lower part of the main shaft 24 together with other operations under strict conditions.

Below the above described mechanism for discharging food material indicated in FIG. 3 by reference number 59, there is provided a mechanism 60, for feeding a strip of sheet, stamping blanks out from said strip of sheet, and discharging cupped food material and the like, which mechanism may be referred to as "lower mechanism" (FIG. 14). In contrast, the mechanism for discharging food material, comprising the machine chamber 15, may be referred to as "upper mechanism". The lower mechanism 60 comprises a synchronized input mechanism which causes the feeding of a paper sheet from a storage roll, the vertical motions of the female mould, the discharge of food material into formed cups and the discharge of finished product and the like.

The combination of these operations in time sequence will be described with reference to FIGS. 18 to 26. In these figures, arrows a, a', b and b' are used in the same sense as used hereinabove. The arrow c indicates the upward motion of the female mould 101 for forming cups. The arrow c' indicates the downward motion thereof. The arrow d indicates the rotary motion of the inner cylinder 20. The latter motion causes the piano wire 21 to cut food material. The arrow e indicates the pushing motion of a product pusher bar 88 as explained hereinbelow, and the arrow e' indicates the withdrawal of the pusher bar 88. The arrow f indicates the progressive motion of a paper sheet. The arrow f' indicates the rotation of rollers 132 and 133 for drawing out the used paper sheet.

FIG. 26 illustrates by way of example a cycle of operations comprising the motions covered by the above arrows and shows the timing of each motion around the circumference of a circle. The above cycle of operations takes place during one rotation of the main shaft 24. Of the above-described motions, motions a, a', b, b', and d related to the upper mechanism, while motions c, c', e, e', and f relate to the lower mechanism. Referring to FIGS. 14 to 16 a motor 62 is provided as a power source of all the upper and lower mechanisms. The rotation of the motor is transmitted to a shaft 64 within the gear box 61 through a belt 63. The shaft 64 rotates a worm 65 mounted thereto, which worm in turn imparts rotation to the main shaft 24 through a worm wheel 66 mounted on said shaft 24 and engaging the worm 65. The main shaft 24 stands upright and constitutes the main input shaft for the upper mechanism. The main shaft 24 is provided in the gear box 61 with a helical gear 67 which engages a helical gear 68 to transform the rotation about a vertical axis into a rotation about a horizontal axis.

The shaft 69 of the helical gear 68 is provided with a spur gear 70 which engages a gear 71 to rotate a shaft 72 mounted thereto. The shaft 72 is provided with sector wheels 73 and 74 and a sprocket 75.

The sector wheel 74 engages a pinion 77 fixed to a shaft 78. The shaft 78 is also provided with a gear 79 which engages a gear 80 having the same number of teeth as those of the gear 79. A gear 81 mounted coaxially with the gear 80 engages a gear 82 having the same number of teeth as those of the gear 80 to rotate a shaft 83. The transmission of the rotation of the sector wheel 74 to the shaft 83 will be described in more detail. The sector wheel 74 fixed to the shaft 72 has teeth only ⅔ of its circumference as shown in FIG. 27. On the other hand, the number of the teeth of the pinion 77 engaging therewith throughout its circumference is the same as the number of the teeth of the sector wheel 74. Consequently, when the shaft 72 performs continuous rotation, the shaft 78 of the pinion 77 performs one rotation during ⅔ of the time required for the shaft 72 to perform one rotation and is stationary during the remaining ⅓ portion of that time. Since the numbers of the teeth of the gears 79 and 80 are the same and since those of the gears 81 and 82 are also the same, the rotation and interruption of the shaft 83 occur simultaneously with the intermittent rotation of the shaft 78. This timing corresponds to the parts e and e' of the timing chart of FIG. 26.

A crank 84 is mounted on the shaft 83. A crank pin 85 mounted on said crank 84 fits in an elongated opening 87 in a lever 86 to oscillate it about the fulcrum shaft thereof at the lower end (FIG. 17). The lever 86 is connected with the rear end portion of a product pusher bar 88 by means of a pin 89 positioned at the top portion of the lever 86. Thus, one rotation of the shaft 83 causes the pusher rod 88 to progress and withdraw.

Since motions c and c' are conducted during a quarter of the time required for a cycle of operation based on the chart of FIG. 26, the part of the sector wheel 73 having the teeth occupies a quarter of the circumference of the sector wheel. The number of teeth of a pinion 90 engaging the sector wheel 73 is the same as the number of teeth of the latter.

In FIG. 15, the shaft 91 of the pinion 90 is provided with a gear 92 engaging a gear 93, both having the same number of teeth. The shaft 94 of the gear 83 performs one rotation when the sector wheel 73 performs a quarter of one rotation. During the remaining ¾ portion of the rotation of the sector wheel 73 the shaft 94 is stationary. In FIG. 17, the shaft 94 is provided with a crank 95 provided with a crank pin 96, a crank rod 97 is connected with the crank pin 96 and swings a sector wheel 98 about a fulcrum shaft provided at an appropriate position. The swing of the wheel 98 causes the vertical motion of a vertical shaft 99 through a rack 100 mounted on the shaft 99 and engaging the wheel 98. On the upper end of the vertical shaft 99 is mounted the female mould 101. Motions c and c' occur in accordance with the above construction.

A bottom mould 102 is provided in the hollow portion in the female mould 101 separate from the side wall thereof. The bottom mould 102 may be a flat circular plate and is mounted on the upper end of a tube 103 slidably fitted in the central hollow space of the vertical shaft 99. The bottom mould 102 is resiliently supported by a coil spring 104 mounted around the upper portion of the tube 103 and seated on the bottom part of the hollow portion of the female mould. The upper face of the bottom mould 102 is ordinarily maintained slightly higher than the upper face of the female mould. The upper limit of the position of the bottom mould is defined by a stopper 105 at the lower end of the tube 103 so that the bottom mould does not interfere with the pusher rod 88. The stopper 105 also functions to close the hollow in the tube 103 at its lower end. At the center of the bottom mould 102 there is an air suction port 106 which communicates with the hollow portion in the tube 103, which portion in turn communicates with an air cylinder 107 by means of a communicating pipe 144. A bracket 108 is provided at the side wall of the vertical shaft 99. The bracket is fixed to the piston shaft 109 of the air cylinder 107. When the vertical shaft 99 moves upwards, the bracket 108 raises the piston shaft 109, so that air is sucked in through the suction port 106 provided at the center of the bottom mould 102. At this time the hollow portion in the tube 103 is in the state of reduced pressure. The state of reduced pressure continues until the tube is returned to its original position, though the air pressure gradually decreases. Thus, as will be described later, when the male mould 58 and the female mould 101 are separated after the completion of the moulding operation, the bottom mould 102 pulls down the formed cup 143.

Near the periphery of the female mould 101 there is a paper hold plate 111 supported by the female mould 101 through springs 110 so that the upper face of the plate 111 normally protrudes slightly above and beyond the top surface of the mould 101. A die 112 for stamping out a blank from a strip of sheet is fixed at a position between the female mould 101 in its lowered position and the male mould 58. An opening 113 is formed in the die 112 at the center thereof through which the female mould 101 passes. The circumference of the female mould 101 functions as a tap for stamping out the sheet of paper 115. For this purpose the circumference of the mould 101 matches the circumference of the opening 113.

A guide plate 114 guides the paper sheet 115 so that the paper sheet passes along the lower face of the blank stamping die 112. A continuous strip of sheet 115 consisting of paper, an aluminum foil and the like of a certain width is fed from a roll 116. The mechanism for supplying the strip of sheet 115 timely, i.e. the mechanism for the motion f will next be described. The shaft 72 on which the sector wheels 73 and 74 are mounted extends outwardly from the casing of the gear box 61. A sprocket 75 is fixed to the portion of the shaft 72 positioned outside the casing. This sprocket is connected by a chain 112 with one 119 of three sprockets 119, 120 and 121 fixed to a shaft 118 (FIG. 16) supported at the upper part of the gear box 61. The rotation of the shaft 72 is transmitted to the shaft 118 through the sprockets 75 and 119 and the chain 122 and is further transmitted to a shaft 125 (FIG. 14) through the sprocket 121 and a chain 123. The rotation of the shaft 125 rotates rollers 130 and 131 through gears 126, 127 and 128, 129 in the direction for drawing the strip of sheet. The rotation of the rollers 130 and 131 is continuous in the direction of the arrow m. By the rotation of the rollers 130 and 131 the strip of sheet is drawn continuously at a constant speed from the roll 116.

As described above, the strip of sheet 115 passes immediately below the stamping die 112 and blanks are stamped out in circular or elliptic shapes from the sheet along its center line. Then the strip of sheet is wound by take-up rollers 132, 133, and 134. The rotation of the take-up rollers 132, 133, and 134 is caused by the rotation of a shaft 136 through the sprocket 120 and a chain 135 which is transmitted to a shaft 138 through a chain 137. The number of rotations of the shaft 138 is the same as that of the shaft 72. A sector wheel 139 fixed to the shaft 138 has teeth at a portion ¼ of its circumference. This ¼ portion is based on the timing f in FIG. 26. The pinion 140 which engages the sector wheel 139 performs intermittent rotation. The combination of the sector wheel 139 and the pinion 140 may be replaced by a Geneva gear and a complementary gear. The intermittent rotation of the pinion 140 based on this timing chart is transmitted to the take-up rollers 132, 133, and 134.

Since the rollers 130 and 131 for drawing the strip of sheet from the roll 116 are of continuous rotation (arrow m) and since the take-up rollers 132, 133, and 134 are of intermittent rotation (arrow f), the strip of sheet periodically slacks. To avoid the slacking of the strip of sheet a roller 141 is provided which is biassed upwardly by a weak spring to remove the slack (arrow n).

Rollers 142, 142 which receive input from the shaft 136, drive a continuously travelling take out conveyor 145.

In FIG. 2; a handle 146 locks a dough ejector mechanism 59 of the upper mechanism at a predetermined position. When the handle 146 is turned in the direction of an arrow Q for disassembling, the ejector mechanism 59 is rotated in the direction of an arrow S about the main shaft 24 as a fulcrum. The above mechanism substantially facilitates washing.

The operation of the apparatus according to the present invention will be described with reference to an embodiment shown in FIGS. 18 to 25. The main shaft 24, as well as the rollers 130 and 131 and the take out conveyor 145, always performs constant rotation.

The other mechanisms performing intermittent motions operate in accordance with the timing chart as shown in FIG. 26. By the repetition of these synchronized operations the products are manufactured continuously.

Speaking conversely, what is necessary in addition to the operations a, a', b, b', c, c', d, e, e', and f is the timing relationship among these operations.

Figure 18:
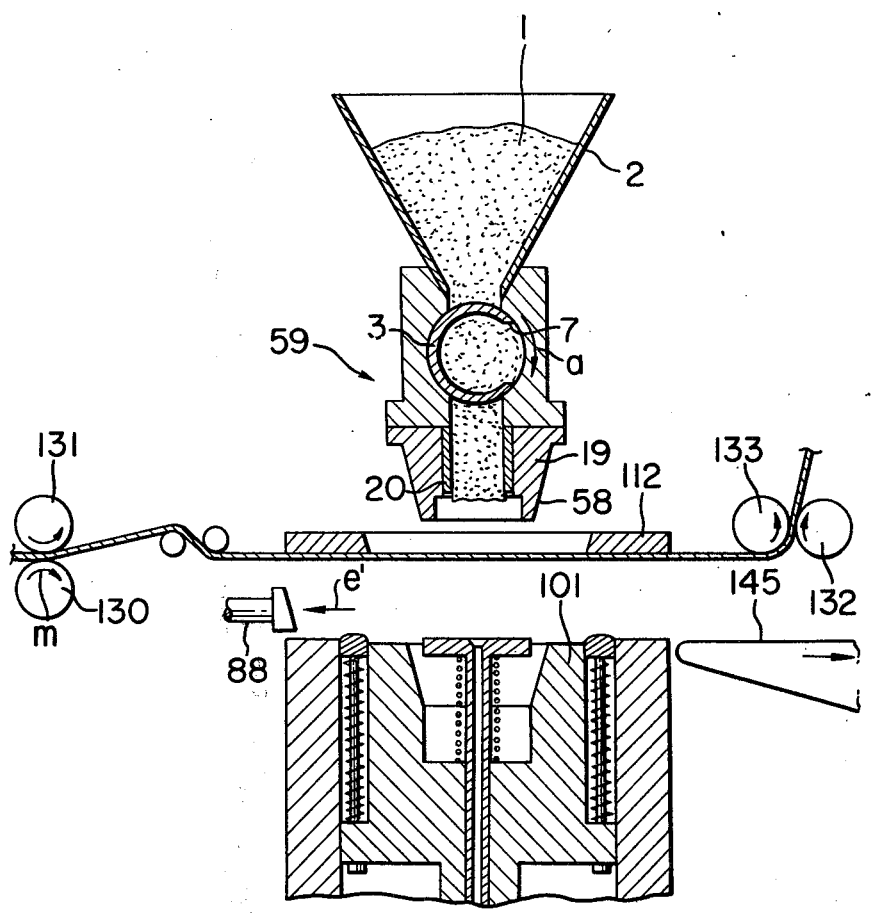
Figure 19:
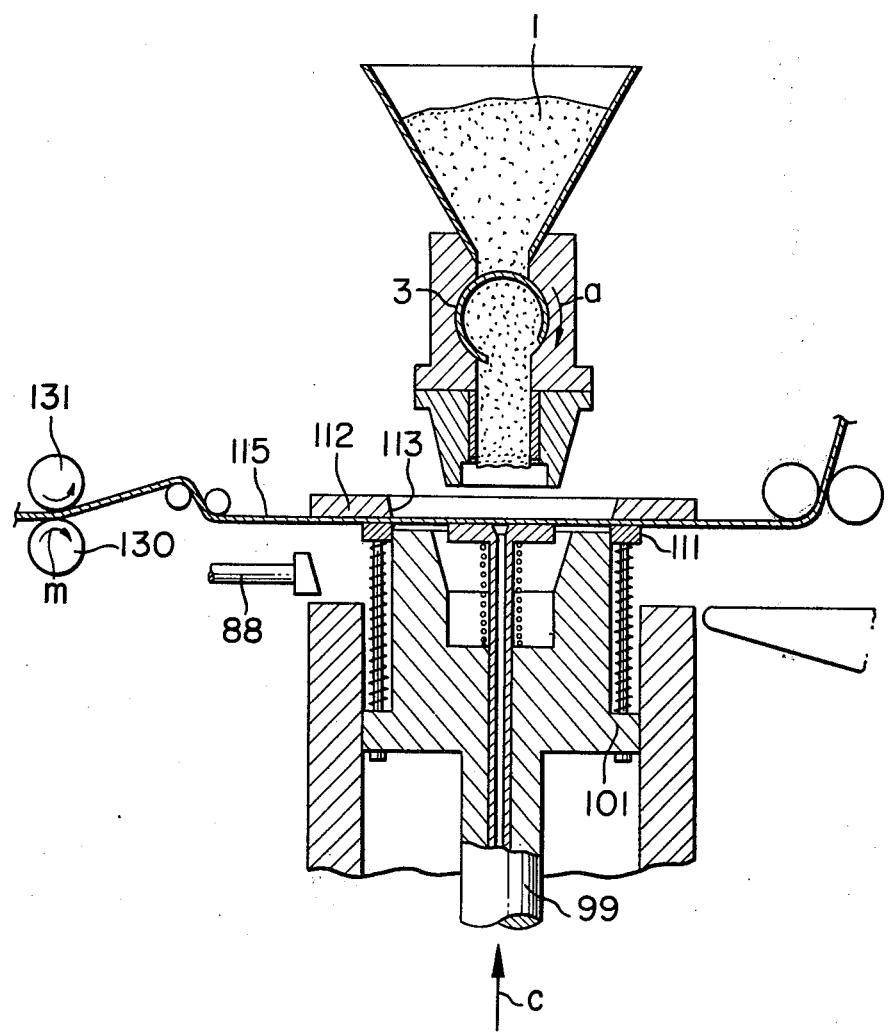

FIG. 18 shows the motion a generated by the continuously rotating main shaft 24, which rotates the cylinder 3 through the sector wheel 26 fixed to the main shaft and the pinion 30 engaging the sector wheel 26. During motion a, motions f and e' may be performed simultaneously therewith. If motions f and e' have been completed, it is more efficient to simultaneously perform the motion c. FIG. 19 shows this simultaneous motion. The motion c is associated with the intermittent motion of the pinion 90 meshing with the sector wheel 73, which performs the same rotation as that of the main shaft 24.

FIG. 19 shows the state that the sheet hold plate 111 provided around the female mould 101 presses the paper sheet 115 against the lower face of the blank stamping die 112 before the rising female mould 101 contacts the strip of sheet 115. At this instant, the female mould 101 has not yet contacted the strip of sheet 115.

Since the edge of the upper face of the female mould 101 is of a saw tooth shape or closely matches the opening 113, the sheet hold plate 111 facilitates the stamping operation when the female mould 101 passes through the opening 113.

Figure 20:
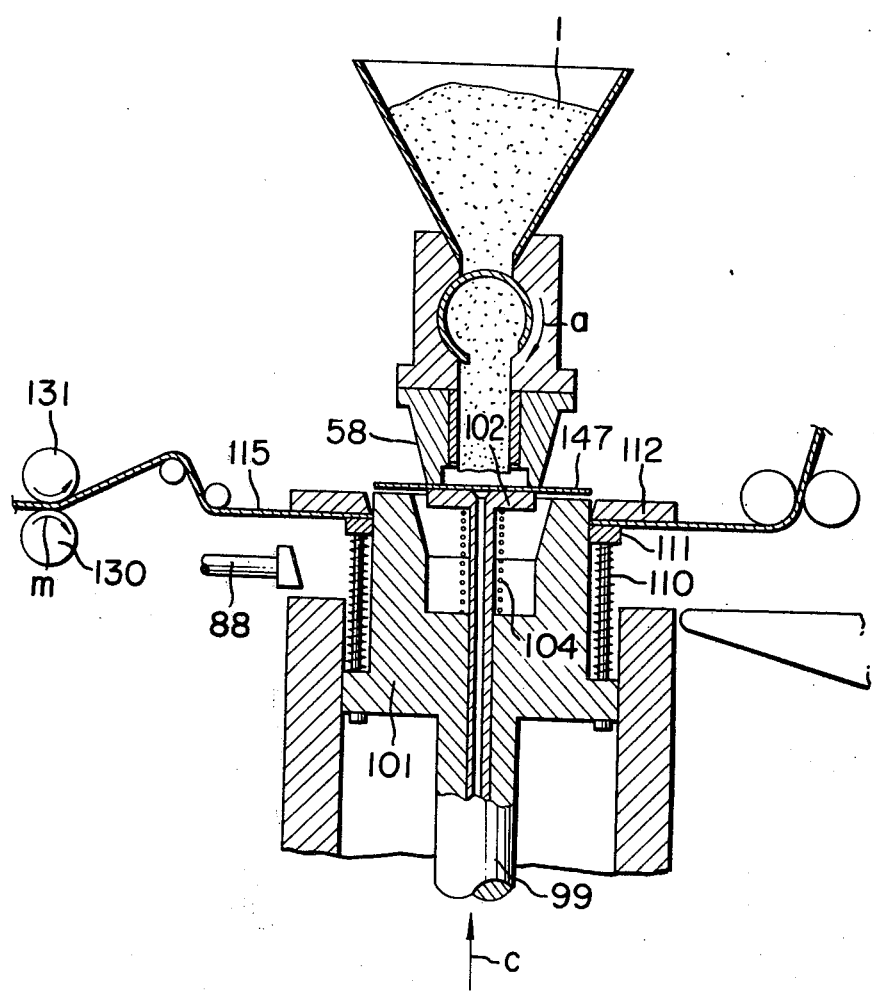

The thus stamped out blank 147 is pressed by the bottom mould 102 against the bottom of the male mould 58 and fixed as shown in FIG. 20. At this time the sheet hold plate 111 remains in contact with the blank stamping die 112 by the action of the spring 110.

Figure 21:
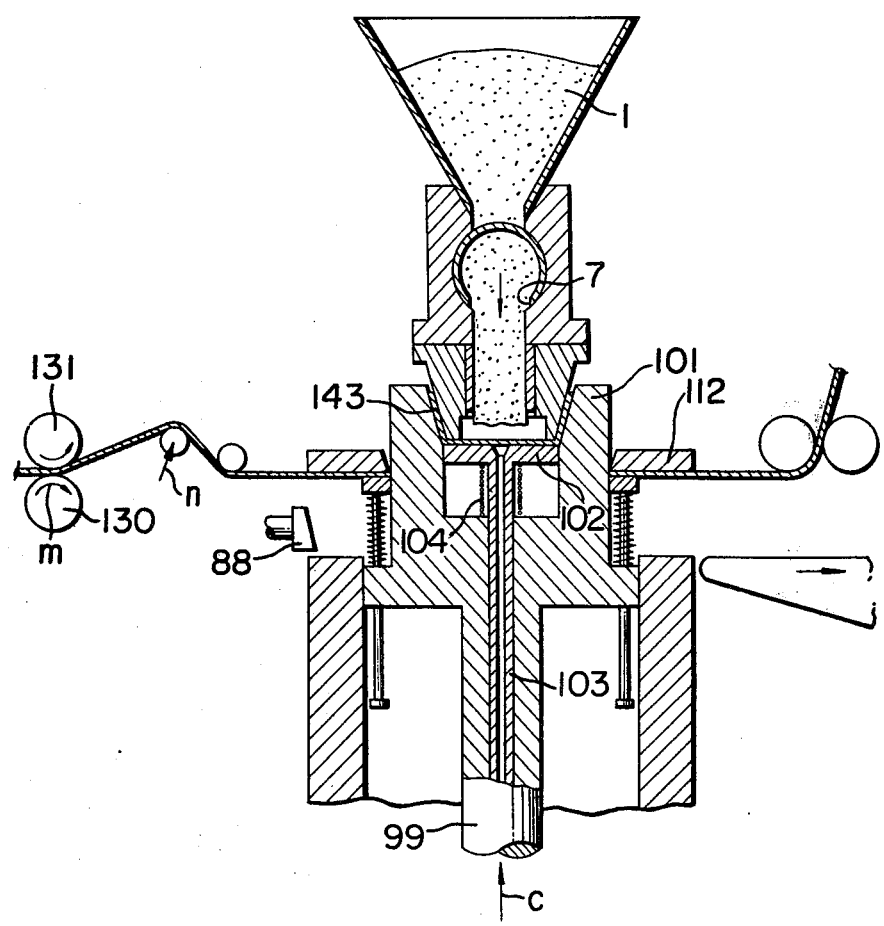

While the stamped out blank 147 is fixed to the bottom of the male mould 58 by the bottom mould 102, the female mould 101 gradually mates with the male mould 58 as shown in FIG. 21. At this time the bottom mould 102 remains pressed against the bottom of the male mould 58 by the compression of the spring 104. The motion c completes when the female mould 101 closely mates with the male mould 58 with the blank 147 interposed therebetween. At this time the motion a also completes, and the motion b, i.e. the motion of the piston which moves forward to push food material 1 out of the hole 7 of the cylinder 3 begins. The receding movement of the pusher rod 45 caused by the motion of the cam follower 44 regulated by the cam groove 43 begins simultaneously with the discontinuation of transmission effected at the toothless part of the sector wheel 26. This receding movement results in the forward movement of the piston 4 regulated by the lever 49.

Figure 22:
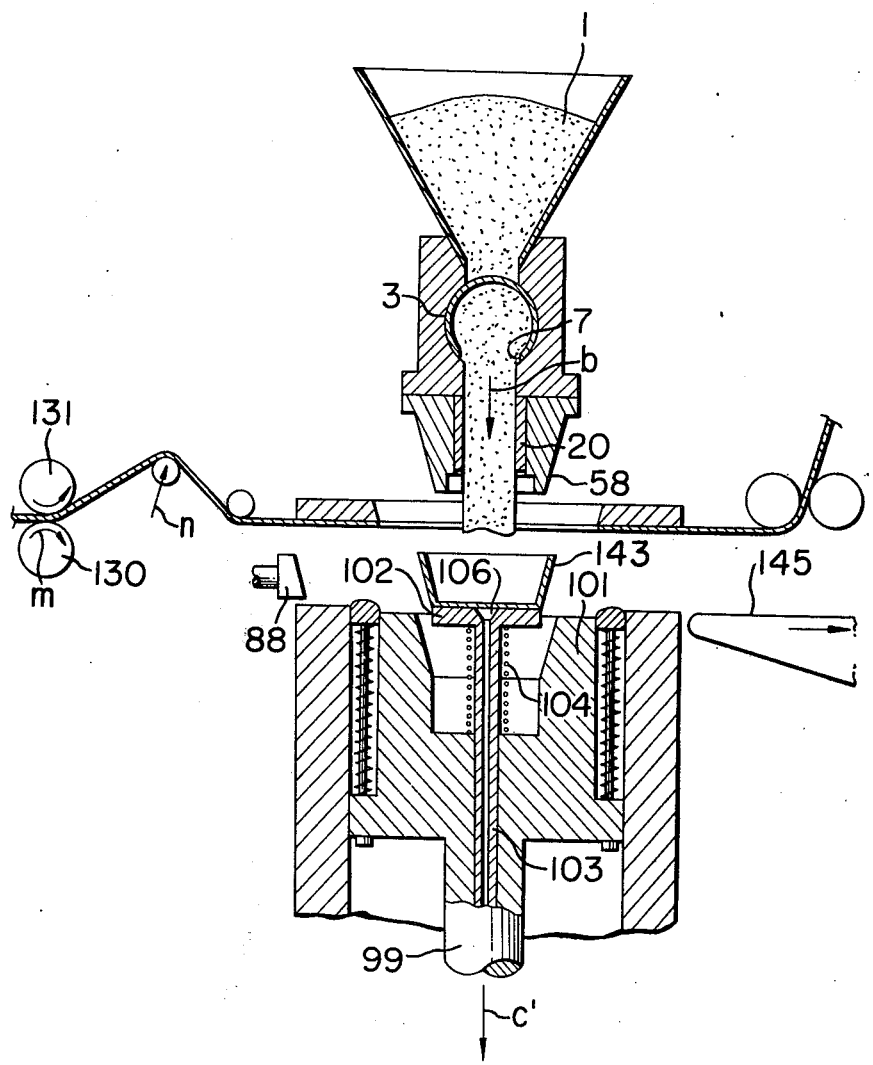
Figure 23:
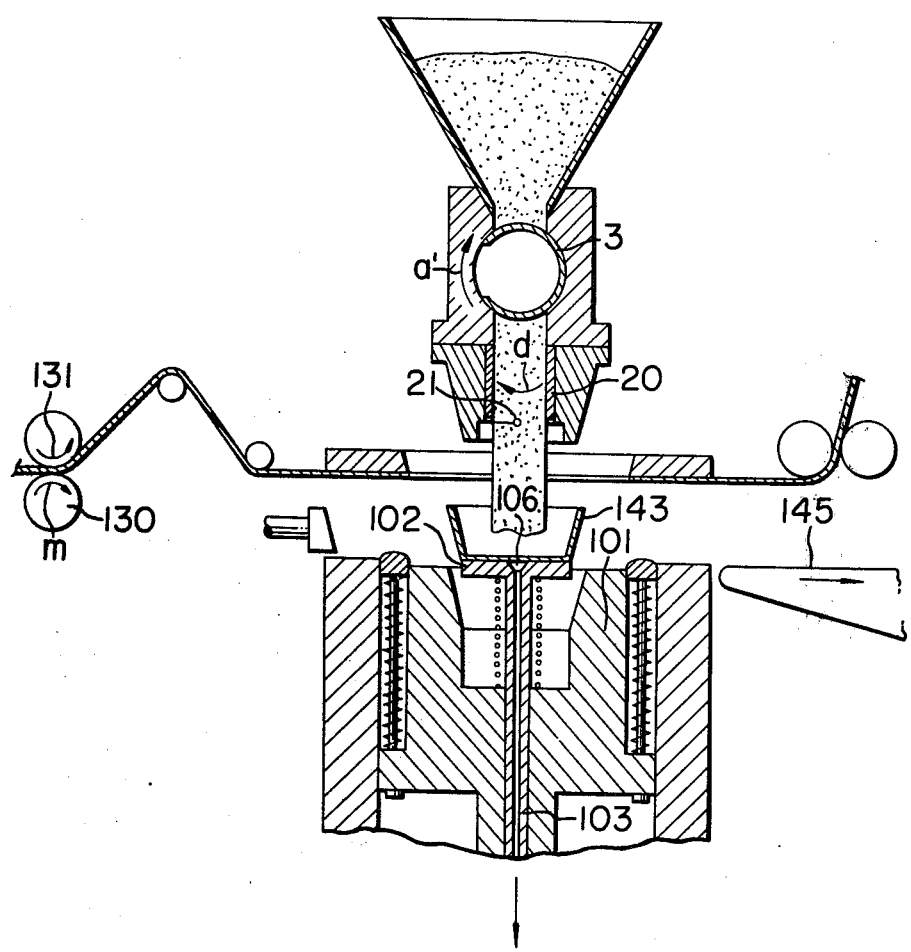
Figure 24:
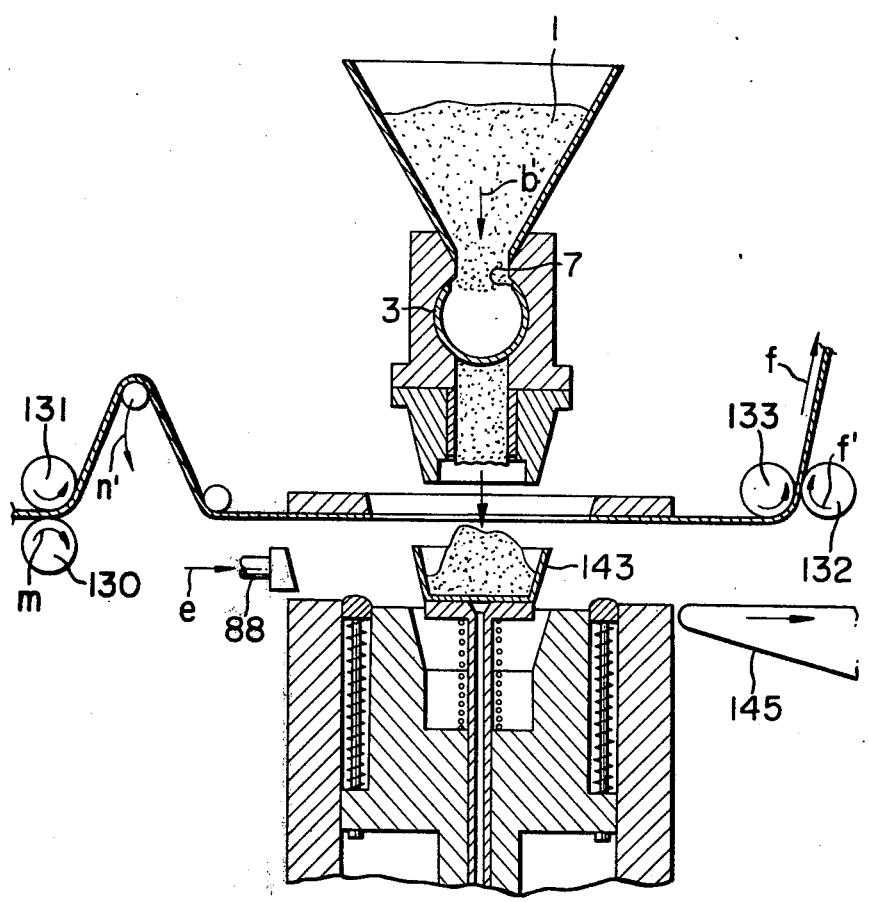
Figure 25:
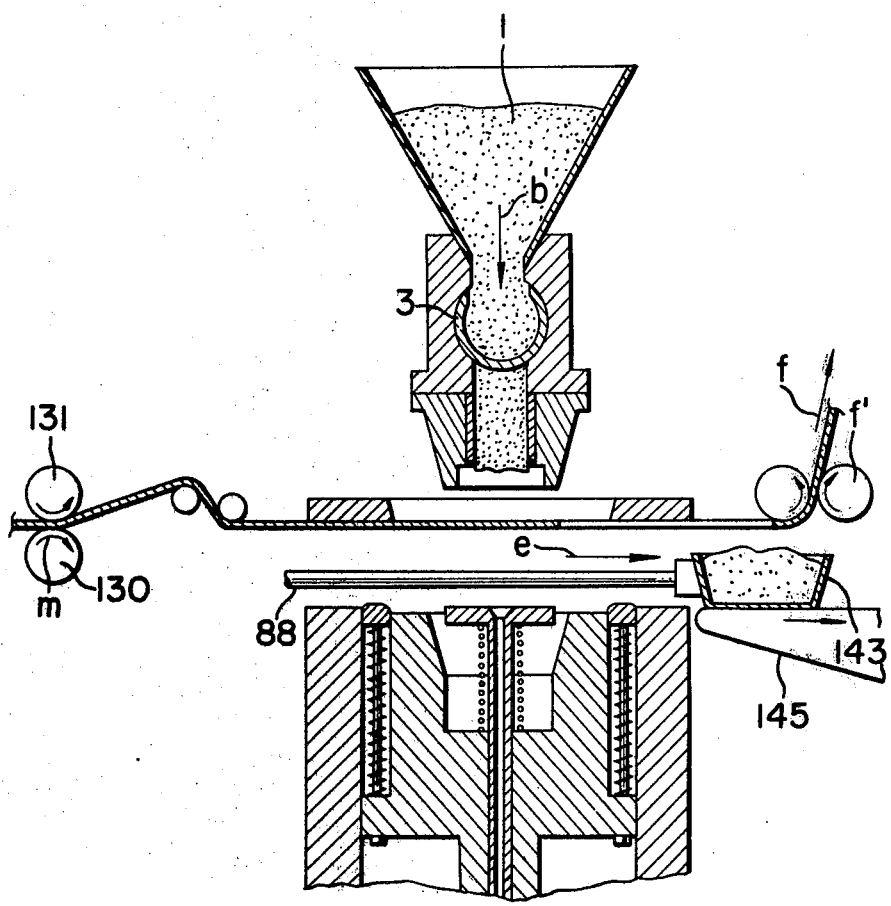

By movement b food material 1 in the cylinder 3 is pushed out of the cylinder 19 or 20 through the hole 7 in the cylinder 3. At the exit of the cylinder there is positioned a cup 143 formed by compression between the female mould 101 and the male mould 58, waiting for receiving food material (FIG. 22). Movement b may begin a moment before the time the pressing action completes as illustrated in FIG. 21.

The movement c completes with a 180° rotation of the crank. Since the crank 95 performs a 360° rotation, the movement c' occurs during another 180° rotation.

FIG. 22 shows the descended state of the female mould 101 caused by the movement c'. Since suction through the opening 106 at the center of the bottom mould 102 still remains during this descending motion, the formed cup 143 is lowered with the bottom mould 102 attached thereto without displacement of its position relative to the bottom mould 102.

Simultaneously with the completion of the movement b (pushing out by the piston 4) the movement d begins. This is the rotation of the inner cylinder 20. When the inner cylinder 20 is provided, since it rotates, food material in the inner cylinder 20 also rotates therewith. Consequently, the fixed piano wire 21 provided at the outer cylinder 19 separates the food material pushed out of the inner cylinder 20 from the food material remaining in the inner cylinder 20.

The operation d, namely, the operation of the piano wire to cut off the food material pushed out of the inner cylinder 20 is unnecessary for fluid food material, for example dough for sponge cake. However, it is necessary for harder dough (more difficult to flow) like poundcake. If this operation does not exist, food material depends from the cylinder for a considerably long time until it is torn off by gravity thereby hindering the immediate occurrence of the next cup discharge operation (operation e).

The food material cut off by the piano wire 21 drops in the underlying vacant cup 143, while the food material in the inner cylinder 20 remains therein adhering thereto due to its low fluidity.

When the food material is in a fluid state, it does not remain in the cylinder 20 but all flows into the cup 143.

However, the flow of the food material out of the cylinder 3 is blocked, when the hole 7 has turned upwardly due to motion a' of the cylinder 3. Since motion a' occurs simultaneously with the motion d to cause the hole 7 of the cylinder 3 to turn upwardly, the communication between the cylinder 19 and the chamber of the cylinder 3 is separated. Thus, the inner cylinder 20, the piano wire 21 and the bevel gears 11 and 22 are unnecessary.

Next comes the operation e, wherein a finished product, i.e. a cup filled with food material is transferred onto the take out conveyor 145 disposed outside the female mould 101 to clear the upper face thereof.

It is efficient if operation e, operation f (the operation of supplying the sheet 115 to the opening 113) and operation b' are performed simultaneously. These three operations do not interfere with one another. Operation e, namely, the intermittent motion of the pusher rod 88 pushing out the cupped food material is caused by the rotation of the crank 84 which again is caused by the pinion 77 engaging the sector wheel 74.

One half of a 360° Rotation causes the operation e to take place, and the other half effects the operation e', i.e. the backward movement of the pusher rod 88.

The operation f is performed by the intermittent rotation of the rollers 132 and 133, which draw the strip of sheet 115.

The rollers 132 and 133 rotate with the strip of sheet 115 interposed therebetween in accordance with the timing chart of FIG. 26. The roller 134 is the reel for winding the used strip of sheet 115.

The arrow b' represents the stage of operation where the piston 4 recedes when the hole 7 faces the discharge end of the hopper 2 and food material 1 in the hopper 2 is sucked into the cylinder 3 by the receding movement of the piston 4.

The amount of the receding movement of the piston 4 is proportional to the amount of food material 1 to be discharged at one time. The strokes of the piston 4 are controlled by the lever 49.

The above operations are conducted during one rotation of the main shaft 24. This embodiment is an example wherein a cupped food material is manufactured during one rotation of the main shaft 24. The continuous rotation of the main shaft 24 repeats the states shown in FIGS. 18 to 25, whereby cupped food materials are continuously manufactured.

It is an important factor to determine the practicability of this kind of automatic manufacturing apparatus whether mounting or demounting for sanitary cleaning is readily performed or not. An advantage of the present invention is that all inputs are imparted to the upper mechanism including the food material ejector mechanism 59 by the single main shaft 24 and cleaning is facilitated by turning the ejector mechanism including the hopper in the direction of the arrow S as shown in FIG. 2, about the bearing post 25 mounted on the lower mechanism 60.

Based on the feature that all portions of the upper mechanism are synchronously driven by the single main shaft 24 extending from the lower gear box 61, the rotation of the upper mechanism may readily be effected. The rotation of the upper mechanism contributes to prevention of viscous fluid food material from dropping on and adhering to the underlying strip 115 and female mould 101 when the hopper 2, cylinder 3 or cylinder holder 12 is demounted for cleaning. Further, the apparatus of the present invention is made highly practical by virtue of the interconnecting mechanism of the keyway 9 and key 18 which makes it possible to mount and demount the piston-cylinder assembly and restore synchronized operation after remounting very readily.

Another embodiment of the means for cutting a blank from the strip of sheet will next be described.

Figure 28:
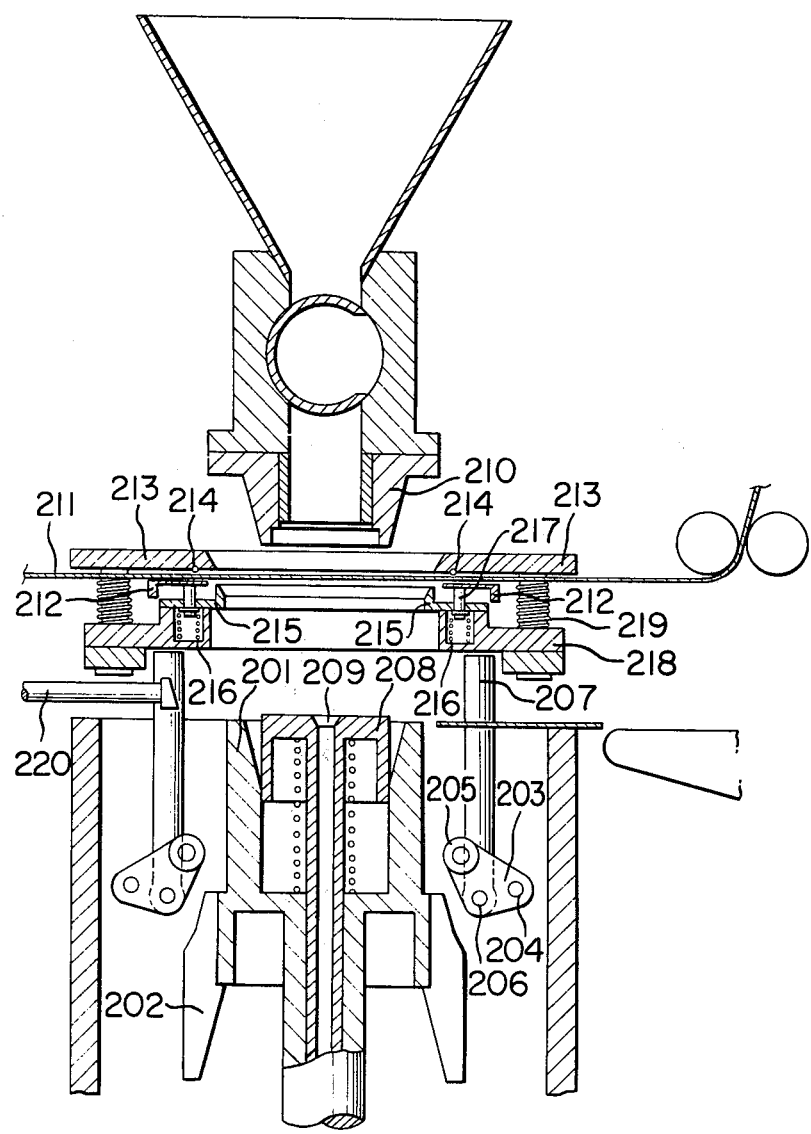

In FIG. 28, a cup moulding female member 201 for cup formation is allowed to move vertically by means of the same transmission drive mechanism as shown in the aforementioned embodiment.

One or a plurality of cams 202 are fixed to the lower portion of the periphery of the female mould 201. Each cam 202 has an acute curve on the upper outside portion and moves vertically simultaneously with the vertical movement of the female mould 201. Swing arms 203 rotate about the rotatably mounted pins 204 as the fulcrums and are provided with freely rotatable rollers 205 at their top portions and rotate guided by the cams 202 through the rollers 205. Pins 206 are rotatably provided at the lower end portions of the vertically movable bars 207 and at the mid portions of the swing arms 203. The vertical movements of the bars 207 are transmitted by the rotations of the swing arms 203.

A member 208 which is provided at the central portion of the inside of the female mould 201 functions as the bottom mould for forming the bottom portion of a cup. The member 208 has at its center a hollow tube 209 which is used for pulling the bottom of the formed cup on the member 208 by suction to ensure the cup to descend along with the descent of the female mould 201.

A cup moulding male member 210 forms the blank positioned between it and the mating female mould 20 into a cup.

A strip of sheet 211 is fed to be cut for forming a cup. The sheet may be made of an aluminum foil or paper. A sheet hold plate 212 for fixing the strip of sheet when a blank is cut out therefrom facilitates the cutting of the blank by keeping the strip of sheet between it and the sheet holding ring 214 provided on the underside of a stationary stamping female die 213.

A cutter 215 is disposed adjacent the sheet hold plate 212 connected to shafts 217 which in turn are operatively connected to a bracket 218 through springs 216. The cutter 215 is fixed to the bracket 218. A plurality of springs 219 are mounted between the female die 213 and the bracket 218 for moderating the impact to the overall cutter device and for urging the descending movement thereof after the completion of the cup forming operation. A pusher bar 220 is for pushing a cupped food material out of the apparatus.

The operation of the embodiment will next be described.

FIG. 28 shows the state of the apparatus immediately before the start of its operation, in which the sheet 211 is positioned over the hole formed in the central portion of the sheet stamping female die 213.

Figure 29:
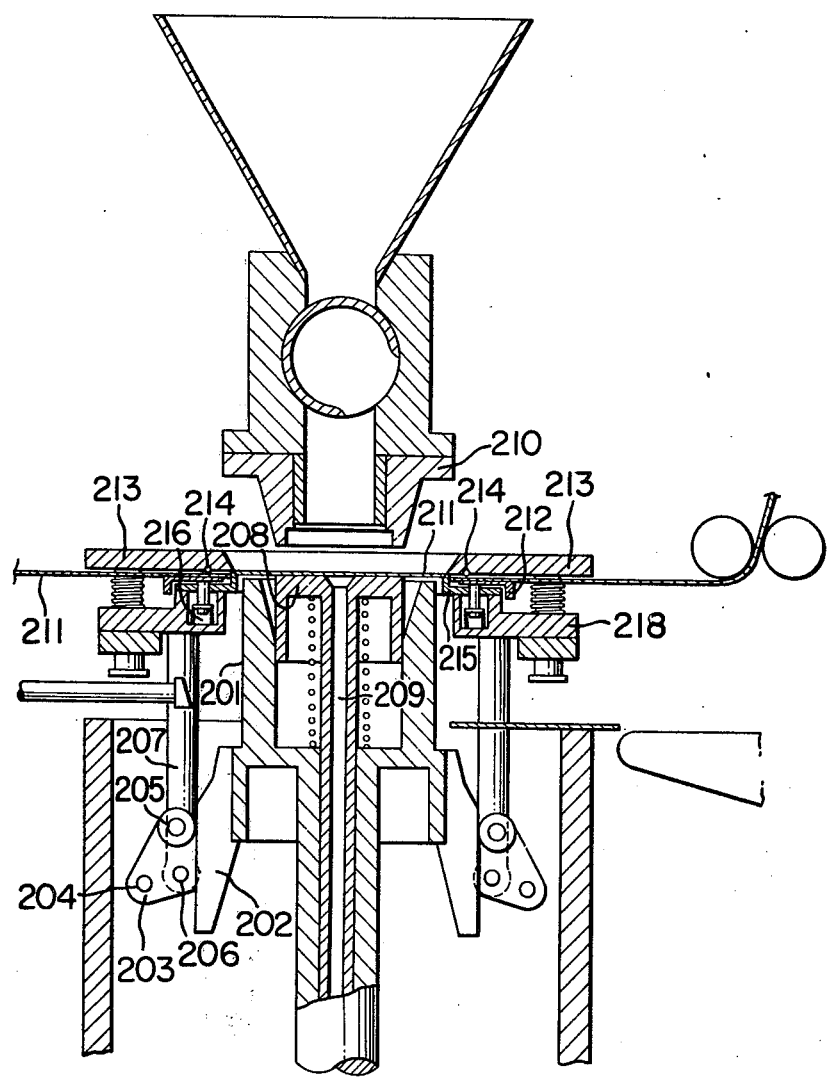

As shown in FIG. 29, the female mould 201 is moved upwardly by the same transmission mechanism as shown in the former embodiment. In this case, the cam 202 fixed to the lower part of the periphery of the female mould 201 ascends along with the ascent of the female mould 201 to engage the rollers 205 at its outer face. With the start of the operation of the rollers 205 the swing arms 203 rotate about the pins 204 and simultaneously therewith the pins 206, while rotating, push upwardly the vertically movable bars 207.

The vertically movable bars 207 push upwardly the bracket 218, and the cutter 215 ascends to cut the strip of sheet 211. In this case, prior to the blade of the cutter 15 coming into contact with the sheet 211, the sheet hold plate 212 positioned at the upper portion of the cutter 215 holds the sheet 211 between it and the sheet hold ring 214 to prevent the shift of the sheet 211 at the time of the stamping action.

After the sheet hold plate 212 has stopped at the upper dead point, the blade of the cutter 215 ascends higher than the lower face of the sheet stamping female die 213 by means of the contraction of the spring 216 to cut the sheet 211. The sheet 211 is cut by the above-described process and immediately thereafter the upper face of the bottom mould 208 comes into contact with the lower face of the stamped blank. This means that the stamping of the sheet is possible prior to the upper face of the bottom mould 208 coming into contact with the lower face of the sheet 211. Since the upper face of the bottom mould 208 is higher than the horizontal upper face of the female mould 201, if the contact between the upper face of the bottom mould 208 and the lower face of the sheet was earlier than the stamping of the sheet, the upper face of the bottom mould 208 would pull the sheet to form folds and deformation which are harmful to the formation of cups.

Figure 30:
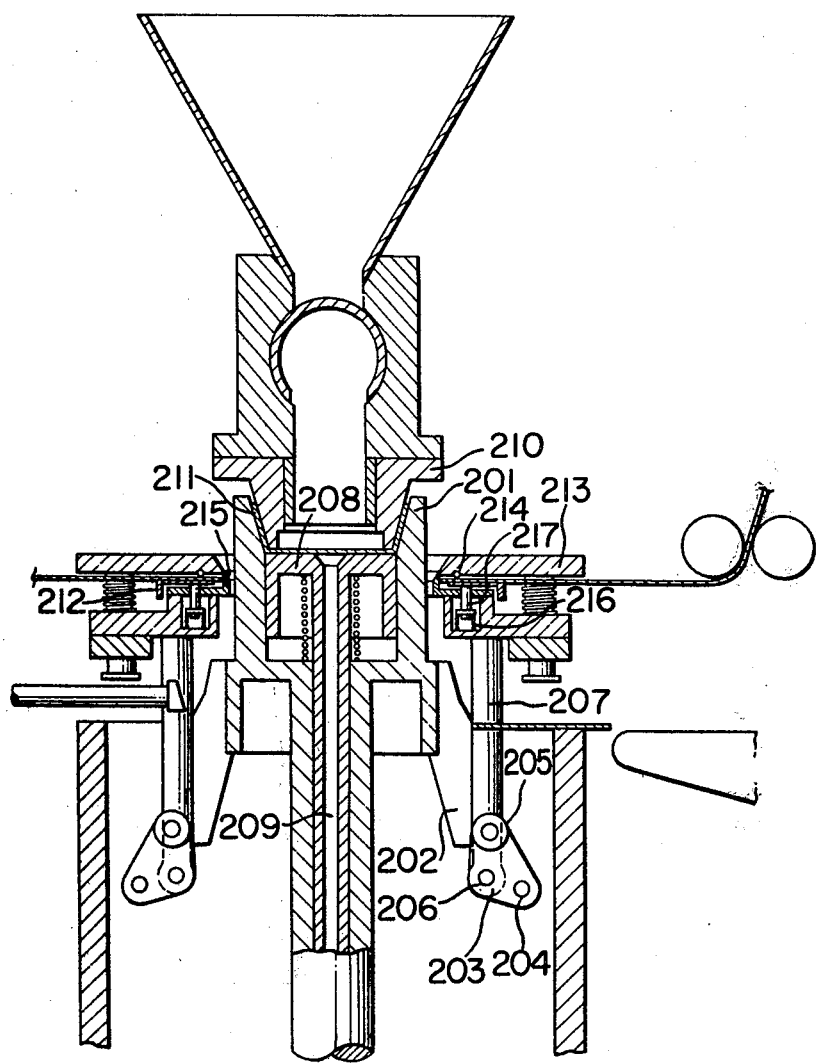

FIG. 30 shows the state in which the female mould 201 after a further ascent, holds the sheet between it and the male mould 210 to form a cup.

In this case, the roller 205 is pushed out to the outermost position from the female mould 201 at the time of the completion of the stamping of the sheet as shown in FIG. 29 and maintains the vertically movable bar 207 at the upper dead point. This position is maintained until the completion of the cup forming operation as shown in FIG. 30, namely, until the upper dead point of the female mould 201 is reached. Consequently, the shape of the cam 202 is such that the part thereof which first engages the roller 205 forms an acute curve having a convex portion and the part following the acute curve portion is upright.

Figure 31:
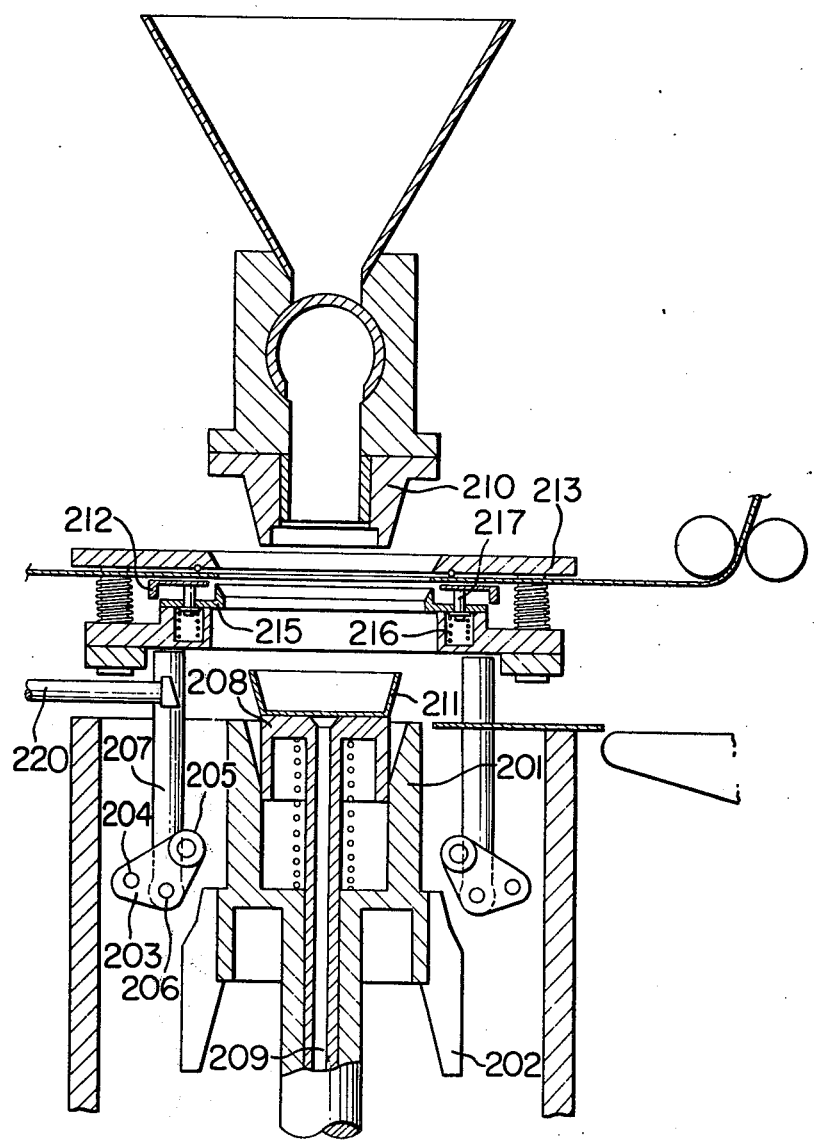

The cup formed by compression between the female mould 201 and the male mould 210 is allowed to descend with its bottom held on the upper face of the bottom mould 208 by the suction caused by the reduced pressure within the tube 209 by a mechanism similar to that described in the former embodiment to a position at which the cup is to be pushed out by the pusher bar 220 as shown in FIG. 31. In this case, the vertically movable bar 207 descends to the original position due to the disengagement of the cam 202 from the roller 205. As a result, the cutter 215 and the sheet hold plate 212 return to their original positions for the next cycle of operation.

The above embodiment has the following advantages over the former one. First, the cutter is disposed adjacent the underside of the strip of sheet, and its blade portion does never protrude from the upper face of the female die 213 for the sheet cutting operation. Thus, the handling of the cutter is quite safe. Second, the cutting operation is performed prior to the upper face of the bottom mould 208 coming into contact with the sheet 211, so that "distortion" of the sheet which may appear by the thrust of the bottom mould against the sheet can be avoided by the difference of time between the time the upper face of the bottom mould 208 comes into contact with the sheet 211 and the time a blank is stamped out. Third, the embodiment eliminates such a member as the sheet hold plate of the former embodiment provided near the level of the horizontal upper face portion of the female mould. Consequently, there is nothing to hinder the discharge of a cupped food material.

An outstanding feature of the apparatus of the present invention is that it enables the use of a strip of sheet such as aluminum foil as a material for cups. It has been impossible in the past to form a cup by cutting blanks from a sheet of aluminum foil because of it being extremely soft and likely to form wrinkles when cut. Thus, usually a plurality of sheets were overlapped and blanks were cut from the overlapped sheets by one operation and the blanks were subsequently moulded simultaneously. The apparatus of the present invention has obviated the process of overlapping sheets by virtue of the mechanism as above-described and has achieved a substantially completely automated apparatus for manufacturing cupped food materials.

Although preferred embodiments of the present invention have been illustrated and described, it will be apparent to those skilled in the art that various changes and alterations may be made therein without departing from the spirit of the invention and the scope of the appended claims.

We claim:

1. An apparatus for automatically manufacturing cupped food materials, comprising:

means for intermittently advancing a strip of sheet material along a predetermined path;

means at least partially situated along said path for cutting out at a predetermined location therealong a blank from said strip;

means at least partially situated along said path for moulding at said predetermined location a cup from said blank, said cup moulding means comprising a male mould member fixedly secured above said path, a female mould member normally positioned beneath said path, a hollow tube passing axially and substantially centrally through said female mould member, said tube being slidable relative to said female mould member, a bottom mould portion adapted to pass vertically within said female mould member and connected with said tube, said bottom mould portion having an opening therein communicating with the interior of said hollow tube, means operatively associated with said hollow tube for reducing the air pressure therein when commencing the moulding of said cup, and means operatively associated with said female mould member for moving it and said bottom mould portion upwardly for moulding a cup from said blank in cooperation with said male mould member;

a hopper situated along said path at said predetermined location;

means operatively associated with said hopper for filling the moulded cup with food material fed through said hopper, said filling means including a passageway formed substantially axially of said male mould member so as to allow food material to pass therethrough from said hopper; and means at least partially situated along said path for moving the cupped food material from said predetermined location.

2. An apparatus according to claim 1, in which said means for cutting out a blank comprises a stationary female die for cutting out a blank and having a horizontal lower surface positioned above and adjacent the path of the strip, said female mould member is provided with a top surface having a peripheral edge for cutting out a blank from said strip in cooperation with said female die, a sheet hold plate which is positioned adjacent said peripheral edge and is normally held slightly above the level of said top surface by a plurality of vertically disposed springs, the lower ends thereof secured to the body of said female mould member, and means for driving said female mould member so as to cut a blank out in cooperation with said female die.

3. An apparatus according to claim 1, in which said means for cutting out a blank comprises a stationary female die for cutting out a blank and having a horizontal lower surface positioned above and adjacent the path of the strip, cam means adapted to move relative to said female die, cam follower means to be driven in response to said cam means, a ring-shaped cutter normally positioned underneath said path of the strip and provided with a blade which is adapted to be driven by said cam follower means to proceed to said female die thereby to cut out a blank in cooperation with said female die, a sheet hold plate which is positioned adjacent said blade and is normally held slightly above the tip of said blade by a plurality of vertically disposed springs, the lower ends thereof secured to the body of said ring-shaped cutter, and means for driving said cam means.

4. An apparatus according to claim 1, in which said male mould member comprises an inner cylinder fitted into said hollow portion so as to be rotatable around the axis thereof, and means secured adjacent the outlet of said hollow portion for separating the leading portion of the food material from the remainder while the food material passes through said hollow portion.

5. An apparatus according to claim 1, in which said food material filling means further comprises a piston-cylinder assembly arranged horizontally between said male mould member and said hopper and rotatable around the axis thereof, the cylinder of said assembly being provided with a hole on the circumferential wall thereof having a profile substantially the same as those of the outlet of said hopper and the inlet of said hollow portion, said hole being able to align with and come adjacent said outlet of the hopper and said inlet of the hollow portion alternately when said cylinder rotates so that the hole may receive food material from said hopper through the outlet thereof and may send food material into said hollow portion through the inlet thereof, respectively, in cooperation with the strokes of the piston rod of said assembly, the piston rod being arranged so that the strokes may be controlled.

6. An apparatus according to claim 5, in which the cylinder is laterally inserted into a cylinder holder fixed relative to the apparatus and is detachably coupled to means for axially rotating the cylinder.

7. An apparatus according to claim 1, including
means operatively associated with said bottom mould portion for holding its upper surface generally at the same level as the top surface of said female mould member when normally positioned;
means interengaging said hollow tube and said female mould member for moving said hollow tube upwardly when said female mould member is moved upwardly until said bottom mould portion abuts on the bottom surface of said male mould member; and
means interengaging said female mould member and said hollow tube and operable after the moulding of a cup for moving said female mould member and said hollow tube downwardly to their normal position to enable filling of the moulded cup with food material, said female mould member and said hollow tube being normally positioned lower than the position of said strip by at least the height of the cupped food material.

8. An apparatus according to claim 1, said means for cutting out a blank, comprising
means situated above said path for stamping out a blank from said strip;
means situated around the periphery of said female mould member for holding said strip while a blank is stamped out therefrom; and
said female mould member being provided at the periphery thereof with a cutting edge for cutting out a blank in coaction with said blank stamping means when said female mould member is moved upwardly.

* * * * *